J. Shellaberger,
Tile Machine.

N° 78,694. Patented June 9, 1868.

Witnesses:

Inventor:
John Shellaberger

United States Patent Office.

JOHN SHELLABERGER, OF SHANE'S CROSSINGS, OHIO.

Letters Patent No. 78,694, dated June 9, 1868.

IMPROVED TILE-CUTTING MACHINE.

The Schedule referred to in these Letters Patent and making part of the same.

TO ALL WHOM IT MAY CONCERN:

Be it known that I, JOHN SHELLABERGER, of Shane's Crossings, Mercer county, State of Ohio, have invented a certain new and useful Machine for Cutting Drain-Tile; and I hereby declare the following to be a full, clear, and exact description thereof, reference being had to the accompanying drawings, making part of this specification.

My invention consists of a machine or tool for cutting clay-tube, as it comes from an ordinary drain-tile machine, into suitable lengths, the cutters being stretched wires, which are confined to a circular path across the tube, so as to shape one end of each length of convex form, and the opposite end concave, this end-shaping being adapted to prevent vertical displacement when the tiles are laid end to end, convex into concave, in the ground. Provision is also made in this machine whereby tile can be cut in a direct line across the tube, if desired.

In the accompanying drawings—

Figure 1:
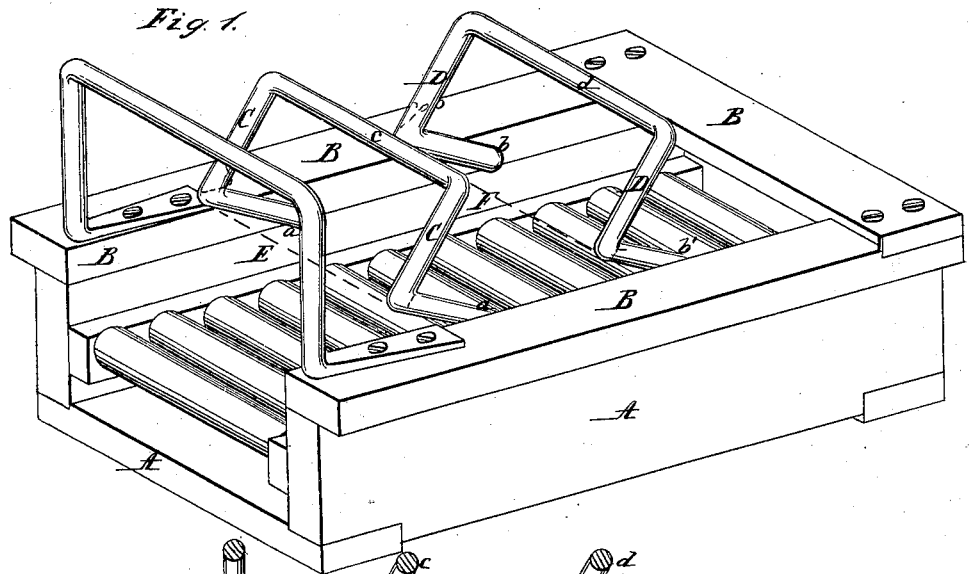
Figure 1 is a perspective view of my tile-cutter.
Figure 2:
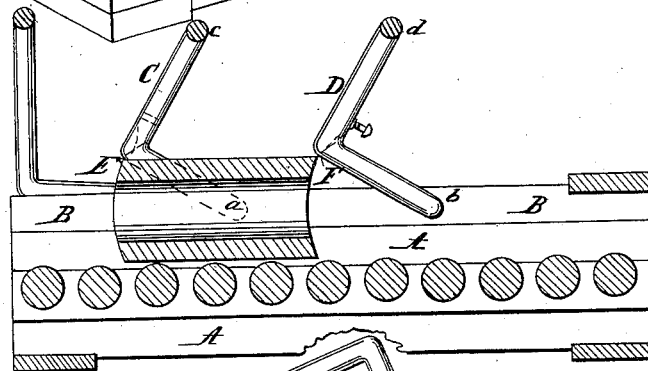
Figure 2 is a longitudinal section.

The frame A may be supposed to represent the ordinary "truckle-roller works" of a drain-tile "way." The frame B, which rests on frame A, has journalled within it, at $a\ a'$ and $b\ b'$, the cutting-wire carriers C D, these carriers being bent, as shown, to form the handles to operate them; and enable the cutting-wires E F to be stretched across the carriers at a sufficient distance from the fulcra to describe the required degree of curve to the cuttings. The action of the carriers and cutting-wires is shown in fig. 2, pressure upon the handles $c\ d$ of the carriers being all that is needed to cut the tile in the manner shown.

Figure 3:
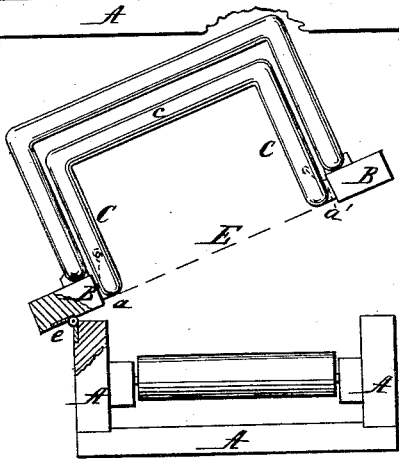
Figure 3 is a cross-section, exhibiting the device for cutting the tile square across.

The frame B, carrying the cutting-wires, is hinged to the frame A at $e$, so that the frame and wires can be swung up bodily in a plane at right angles to the line of tube to be cut, the cutting-wires being stretched in the same plane. By elevating and depressing the frame on the hinges $e$, cuts can be made across the tube, if desired, (see fig. 3.) When the machine is used for curved shaping, as in fig. 2, the wires are across the plane of motion, and the cut is therefore curved.

I claim as new, and of my invention—

1. The pivoted cutters C E D F, constructed and operating substantially as and for the purpose described.
2. The hinged frame B, in combination with the cutters C D E F, for the purpose of adapting them to cut in a vertical plane, substantially in the manner and for the purpose specified.

In testimony of which invention, I hereunto set my hand.

JOHN SHELLABERGER.

Witnesses:
 WM. CLAY,
 G. H. KNIGHT.